(12) United States Patent
Bitar et al.

(10) Patent No.: US 8,027,827 B2
(45) Date of Patent: Sep. 27, 2011

(54) DEVICE, SYSTEM, AND METHOD OF STORAGE CONTROLLER HAVING SIMULATED VOLUMES

(75) Inventors: Akram Bitar, Kfar Peqiin (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 12/117,605

(22) Filed: May 8, 2008

(65) Prior Publication Data

US 2009/0281782 A1    Nov. 12, 2009

(51) Int. Cl.
G06F 9/44 (2006.01)
G06F 13/10 (2006.01)
G06F 13/12 (2006.01)
(52) U.S. Cl. ............... 703/21; 703/24; 714/44
(58) Field of Classification Search ............ 703/21
See application file for complete search history.

(56) References Cited

U.S. PATENT DOCUMENTS

| | | | | |
|---|---|---|---|---|
| 6,678,802 | B2 * | 1/2004 | Hickson | 711/152 |
| 6,738,937 | B1 * | 5/2004 | Bergsten | 714/718 |
| 6,745,145 | B2 * | 6/2004 | Lara et al. | 702/121 |
| 7,100,091 | B2 * | 8/2006 | Nakamoto et al. | 714/43 |
| 7,467,333 | B2 * | 12/2008 | Keeton et al. | 714/41 |
| 7,739,470 | B1 * | 6/2010 | Norgren | 711/168 |
| 7,844,444 | B1 * | 11/2010 | Asbridge et al. | 703/23 |
| 2005/0283348 | A1 | 12/2005 | Tsui et al. | |
| 2006/0090136 | A1 | 4/2006 | Miller et al. | |
| 2006/0203460 | A1 | 9/2006 | Aviv | |

OTHER PUBLICATIONS

Griffin et al, "Timing-Accurate Storage Emulation", Proceedings of the Conference on File and Storage Technologies (FAST), Jan. 28-30, 2002.*
Security Innovation, "Holdeck Enterprise Edition", Help Documentation, version 2.5, Jun. 4, 2004, pp. 1-7, 30-37, 56, 61-65, 74-79, 235-274, retrieved from http://securityinnovation.com/holodeck/help/HD_Help_2_5.pdf.*
Courtright er al, "RAIDframe: A Rapid Prototyping Tool for RAID Systems", CMU-CS-97-142, Carnegie Mellon University, Jun. 1, 1997.*
Busy et al, "The DiskSim Simulation Environment Version 4.0 Reference Manual", CMU-PDL-08-101, May 1, 2008.*
Zhang et al, "Performability Evaluation of Networked Storage Systems Using N-SPEK", Proceedings of the 3rd IEEE/ACM International Symposium on Cluster Computing and the Grid, 2003.*
Security Innovation, "Security Innovation Releases Powerful Testing Tool that Allows Novice Software Testers to Expose Elusive Security and Stability Bugs", Press Release, Aug. 22, 2004.*
Szymczyk et al. "Analysis of Typical Data Centre From The Point of View of Accessibility, Sensibility, Usage of Results in The SLA Agreement", Proceedings of the 12th International Conference Mixed Designs of Integrated Circuits and Systems. MIXDES 2005, Jun. 22-25, 2005, Krakow, Poland (Abstract Only).
Uros Cibej "A Toolkit For Modelling and Simulation of Data Grids With Integration of Data Storage, Replication and Analysis" Source:http://www.gridbus.org/reports.datagrid.pdf).

* cited by examiner

Primary Examiner — Mary Jacob
(74) Attorney, Agent, or Firm — Zilka-Kotab, PC

(57) ABSTRACT

Device, system, and method of storage controller having simulated volumes. For example, an apparatus for data storage management includes: a storage controller to manage access to one or more physical volumes, the storage controller including a simulation module to simulate access to one or more simulated volumes.

21 Claims, 2 Drawing Sheets

DEVICE, SYSTEM, AND METHOD OF STORAGE CONTROLLER HAVING SIMULATED VOLUMES

FIELD

The invention is related to the field of storage controllers, and more particularly, to a device, system and, method of a storage controller having simulated volumes.

BACKGROUND

In some computing systems, a host computer utilizes a storage controller in order to access data stored in storage units. For example, the storage controller receives from the host computer request to read or write data; and the storage controller read or writes the data, respectively, to or from one or more of the storage units. Optionally, the storage controller operates in accordance with data management schemes or structures (e.g., Redundant Arrays of Independent Discs (RAID)), for example, to divide and/or replicate data among multiple hard disk drives, to increase data reliability, or to increase Input/Output (I/O) performance.

An administrator of the computing system may consider adding a new physical volume (e.g., an additional hard disk drive) to a current configuration of storage controller. Such addition may result in changes in the overall performance of the storage controller and/or the computing system, for example, changes in latency, changes in error rates, or the like. Unfortunately, the system administrator may not be able to fully or successfully estimate in advance the impact of adding a new physical volume to a current configuration of storage controller.

SUMMARY

An embodiment of the invention includes devices, systems, and methods of storage controller having simulated or "fake" volumes. An apparatus for data storage management may include: a storage controller to manage access to one or more physical volumes, the storage controller including a simulation module to simulate access to one or more simulated volumes.

In some embodiments, the storage controller includes an interceptor module to intercept a command to access a volume, and if the command is to access the one or more simulated volumes, to transfer the command to the simulation module.

In some embodiments, the simulation module is to simulate latency when simulating access to the one or more simulated volumes.

In some embodiments, the simulation module is to simulate an error when simulating access to the one or more simulated volumes.

In some embodiments, the simulation module is to simulate a limit to the number of concurrent requests that are serviced during a pre-defined time period when simulating access to the one or more simulated volumes.

In some embodiments, the simulation module is to simulate a bandwidth limit when simulating access to the one or more simulated volumes.

In some embodiments, the simulation module is to simulate latency based on one or more user-configurable latency characteristics; to simulate an error based on one or more user-configurable error characteristics; to simulate a bandwidth limit based on user-configurable bandwidth limit characteristics; and to simulate a limit to the number of concurrent operations that are handled during a pre-defined time period based on user-configurable operations limit characteristics.

In some embodiments, the simulation module is to automatically retrieve at least one of: the latency characteristics, the error characteristics, the bandwidth limit characteristics, and the operations limit characteristics, from a characteristics database able to store characteristics associated with a real volume.

In some embodiments, the storage controller includes a performance calculator to measure an effect of the simulated access to the one or more simulated volumes on one or more system performance parameters.

In some embodiments, the storage controller includes storage management logic to handle a command received from a host computer and addressed to the one or more simulated volumes.

In some embodiments, a method for data storage management includes: managing access to one or more physical volumes of a storage controller; and simulating access to one or more simulated volumes of the storage controller.

In some embodiments, a system for data storage management includes: a storage controller to manage access to a plurality of volumes, the plurality of volumes including one or more real volumes and one or more simulated volumes; a simulation module to simulate access to the one or more simulated volumes; a latency injector to inject simulated latency into the simulated access to the one or more simulated volumes; an error injector to inject a simulated error into the simulated access to the one or more simulated volumes; a bandwidth limit simulator to simulate a bandwidth limit in the simulated access to the one or more simulated volumes; and an operations limit simulator to limit the number of concurrent operations that are handled during a pre-defined time period in the simulated access to the one or more simulated volumes.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
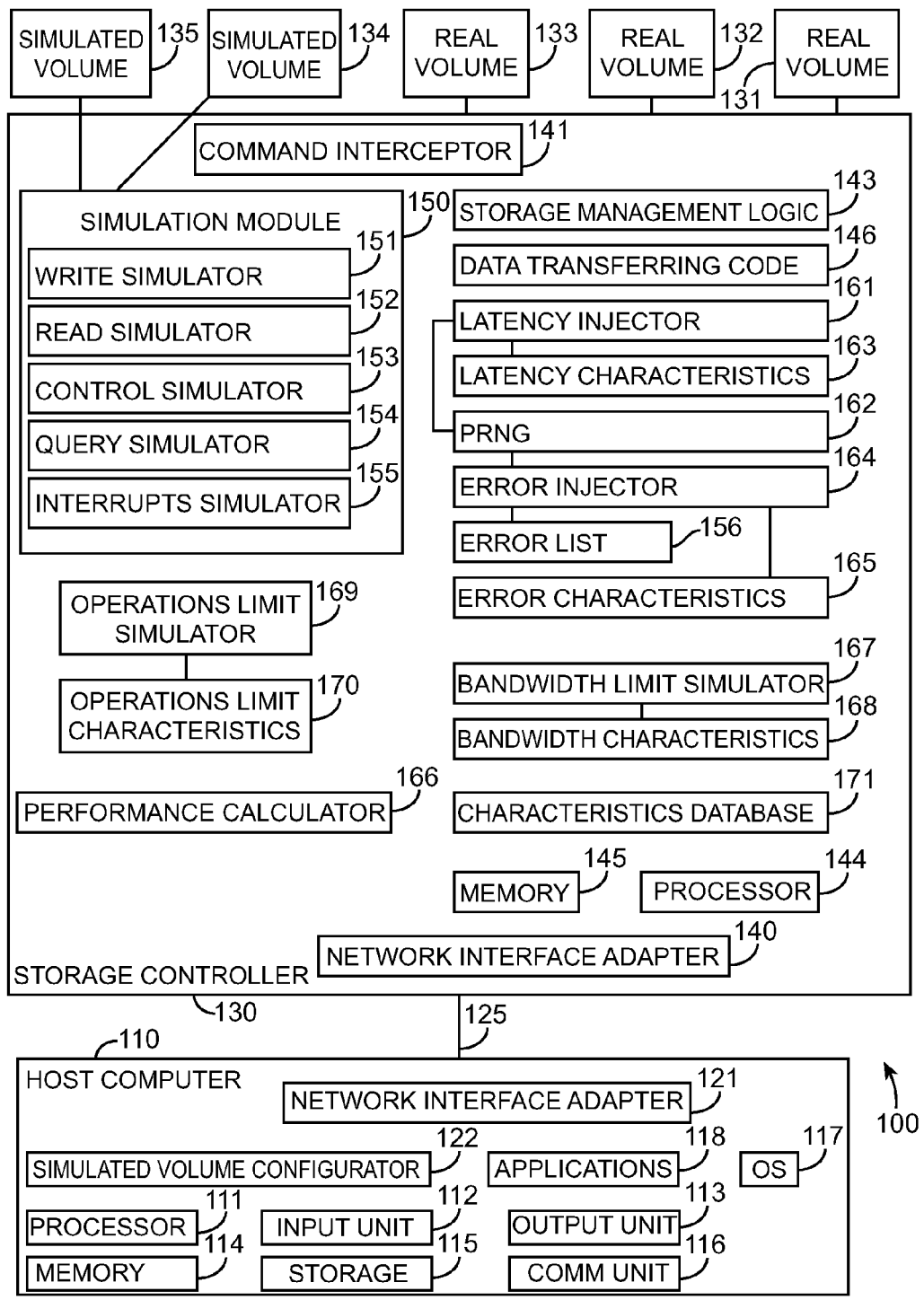
FIG. 1 is a schematic block diagram illustration of a system in accordance with some demonstrative embodiments of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station, a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3.5G, or the like. Embodiments of the invention may be used in various other devices, systems and/or networks.

The term "storage controller" as used herein includes, for example, a controller or unit able to manage data storage; a controller or unit able to manage external and/or internal physical volumes; a controller or unit able to manage external and/or internal logical volumes; a controller or unit able to operate in accordance with data management schemes or structures (e.g., Redundant Arrays of Independent Discs (RAID)); a controller or unit able to divide and/or replicate data among multiple volumes or hard disk drives (e.g., to increase data reliability, to increase Input/Output (I/O) performance, or the like); a controller or unit able to receive and handle write requests, read requests, and other data-related or storage-related requests (e.g., from a host computer); a controller or device that is connected to or attached to physical volumes; a storage device that includes a controller as well as one or more physical volumes; a storage server; a storage system (e.g., similar to IBM Shark; IBM Power5; Hitachi TagmaStore; EMC Symmetrix; or the like); or other suitable storage managers.

The terms "volume" or "logical drive" as used herein include, for example, a storage area associated with a single file system; a logical disk; a logical disk residing on a single partition of a single hard disk; a logical disk residing on multiple partitions of a single hard disk; or the like.

The terms "simulated volume" or "fake volume" as used herein includes, for example, an artificial volume; an emulated volume; a "dummy" volume; a volume that is not associated with a hard disk drive; a volume simulated or emulated to exist (e.g., by a storage controller); a volume simulated or emulated to operate (e.g., by a storage controller); a volume that does not actually store data that a host attempts to write into it; a volume that does not actually provide data that a host attempts to read from it; a semi-operational volume; a volume that includes some, but not all, of the functionalities of a volume; a volume that write attempts thereto are not written into a hard disk; a volume that read attempts therefrom are not read from a hard disk; or the like.

The term "real volume" as used herein includes, for example, a physical volume; a non-simulated volume; a volume associated with at least a portion or a partition of a physical volume or a hard disk; an operational volume; a fully operational volume; a volume associated with a hard disk; a volume that write attempts thereto are written into a hard disk; a volume that read attempts therefrom are not read from a hard disk; or the like.

Although portions of the discussion herein relate, for demonstrative purposes, to a real volume or a physical volume implemented using a hard disk drive or multiple hard disk drives, embodiments of the invention are not limited in this regard. In some embodiments, for example, a real volume or a physical volume may include, or may be implemented using, storage units other than hard disk drives, for example, solid state drives or disks, solid state storage units, storage units having moving parts or moving heads, storage units not having moving parts, solid-state memory, storage units having significantly small latency or seek time or electro-mechanical delays or access time, flash memory, non-volatile memory, NAND flash memory, NOR flash memory, memory able to maintain stored data without power consumption, hybrid drives or hybrid hard drives, ReadyBoost drives or storage units, storage units having spinning parts or non-spinning parts, electro-mechanical storage units, electro-optical or optical storage units, or the like. Similarly, although portions of the discussion herein relate, for demonstrative purposes, to a simulated volume which simulates or corresponds to a hard disk drive or multiple hard disk drives, embodiments of the invention are not limited in this regard, and some embodiments of the invention may simulate other types of storage units.

The terms "host" or "host computer" includes, for example, a computer or a server that initiates a request to read data or write data; a computer or a server that initiates a request to access data or to utilize stored data; a local or remote computer or server; a network-connected computer or server (e.g., in contrast to a network transport device, a router, or a switch); hardware components and/or software components (or combination thereof) that requests to read data or write data; a server computer; a server appliance; a network-connected computer appliance or appliance hardware; a client computer; or the like.

At an overview, some embodiments of the invention provide devices, systems, and methods of storage controller having simulated volumes. For example, the storage controller includes one or more real volumes, and one or more simulated volumes. A simulated volume includes, substantially exclusively, metadata tracks to store metadata; and does not include customer tracks to store customer data. The storage controller includes a simulation module to simulate substantially all track access operations for customer tracks (e.g., read and write operations). For example, write and read operations to the simulated volume are not actually executed, but they do return a completion status, e.g., after a delay period or latency period which may be controlled, or subject to error injection schemes.

In some embodiments, the commands that are used to set-up (e.g., to create and remove) volumes, as well as the commands indicating operations issued to volumes, are augmented or modified in order to support or to specify a simulated volume, optionally utilizing latency injection and error injection. In some embodiments, the code or logic that handles the access of customer tracks for read and write operations is augmented or modified, in order to support access to simulated volumes. For example, substantially each read or write operation to a customer track is simulated by a simulation module of the storage controller, optionally taking into account simulated latency and/or simulated error injection. In some embodiments, code or logic that handles the access to metadata tracks need not be changed. In some embodiments, the user may establish various types of replication and/or mirroring relations between a first simulated volume and a second simulated volume; between a simulated volume and a real volume; or vice versa.

In some embodiments, the simulated volume(s) of the storage controller are used, for example, to simulate replication and/or mirroring solutions; and to aid a test and performance team to estimate or evaluate the impact on system performance of changes in the storage controller configuration (e.g., by simulating the addition of one or more real volumes), thereby reducing efforts, costs and time associated with installing, uninstalling, or configuring real volumes. Accordingly, the system administrator may evaluate the impact or effects of adding new hardware (e.g., new physical volumes) to a current configuration of storage controller, and estimating the impact that this addition may have on a current setup, on applications behavior and on other system performance parameters. Some embodiments allow a customer, who considers purchasing a license to a replication or mirroring function (e.g., a point-in-time copy function, or a synchronization mirroring function), to evaluate in advance the impact of this function on current applications or system performance parameters. Some embodiments allow testing of a new replication or mirroring functions, as well as evaluation of their effect on system performance parameters. Some embodiments may be used to tune or fine-tune the performance of storage controllers. For these tasks, some embodiments obviate the need to install and configure one or more physical volumes, or obviate the installation or configuration of infrastructure to connect new physical volumes; thereby reducing efforts and costs.

FIG. 1 schematically illustrates a block diagram of a system 100 in accordance with some demonstrative embodiments of the invention. System 100 includes a host computer 110 able to communicate with a storage controller 130. For example, host computer 110 includes a network interface adapter 121; storage controller 130 includes a network interface adapter 140; and network interface adapters 121 and 140 are able to communicate through a network or through one or more wired and/or wireless links 125.

Host computer 110 includes, for example, suitable hardware components and/or software components, for example, a processor 111, an input unit 112, an output unit 113, a memory unit 114, a storage unit 115, and a communication unit 116.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or other suitable multi-purpose or specific processor or controller. Processor 111 executes instructions, for example, of an Operating System (OS) 117 or of one or more applications 118.

Input unit 112 includes, for example, a keyboard, a keypad, a mouse, a touch-pad, a joystick, a track-ball, a stylus, a microphone, or other suitable pointing unit or input device. Output unit 113 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, an internal or external database or repository, or other suitable removable or non-removable storage units. Memory unit 114 and/or storage unit 115, for example, store data processed by host computer 110.

Communication unit 116 includes, for example, a wired or wireless transceiver, a wired or wireless modem, a wired or wireless Network Interface Card (NIC), or other unit suitable for transmitting and/or receiving communication signals, blocks, frames, transmission streams, packets, messages and/or data. Optionally, communication unit 116 includes, or is associated with, one or more antennas.

In some embodiments, some or all of the components of host computer 110 are enclosed in a common housing or packaging, and are interconnected or operably associated using one or more wired or wireless links. In other embodiments, components of host computer 110 are distributed among multiple or separate devices or locations.

Storage controller 130 includes, or is connected to, one or more physical volumes or real volumes, for example, real volumes 131-133. Each one of real volumes 131-133 includes, for example, a hard disk drive, a partition of a hard disk drive, or other type of physical volume. In accordance with some embodiments of the invention, storage controller 130 includes a simulation module 150 able to simulate the existence and the operation of one or more simulated volumes defined by a system administrator, for example, simulated volumes 134-135.

Storage controller 130 includes storage management logic 143, for example, in accordance with data management schemes or structures (e.g., RAID). For example, the storage management logic 143 is able to divide and/or replicate data among the multiple volumes 131-135 (namely, real volumes and/or simulated volumes), e.g., to increase data reliability, to increase I/O performance, or the like. Storage management logic 143 may be executed by a processor 144, which may further utilize an internal cache or memory unit 145 for temporary data storage.

Host computer 110 includes a simulated volume configurator application or module 122, for example, as a stand-alone application or as part of a storage-related application (e.g., backup software, mirroring software, synchronization software, or the like). The simulated volume configurator 122 is used by an administrator to define or create a simulated volume, by providing the parameters of the simulated volume to be created (e.g., simulated volume size; simulated volume file system; simulated volume cluster size; or the like). The simulated volume configurator 122 is further used by an administrator to remove or delete a previously-created simulated volume, or to modify one or more properties of a previously-created simulated volume.

Host computer 110 sends a first command to access the real volume 131, and sends a second command to access the simulated volume 135. Storage controller 130 includes a command interceptor module 141, which differentiates between the handling of the first command and the second command. The command interceptor module 141 determines that the first command is intended to be executed by a real volume, and thus the command interceptor module 141 allows a data transferring code 146 to handle the first command vis-à-vis the real volume 131. In contrast, the command interceptor module 141 determines that the second command is intended to be executed by a simulated volume, and thus the command interceptor module 141 routes the second command for simulation by the simulation module 150.

The simulation module 150 implements, for simulated volumes, an interface of a real volume (e.g., read, write, control, or the like), and optionally includes sub-modules to simulate particular types of commands or operations. For example, the simulation module 150 may include a write simulator 151 to simulate write operations to simulated volume(s); a read simulator 152 to simulate read operations to simulated volume(s); a control simulator 153 to simulate control operations to simulated volume(s); a query simulator 154 to simulate query operations to simulated volume(s); an interrupts simulator 155 to simulate interrupts operations to simulated volume(s); or the like.

The simulation module 150 may be associated with a latency injector 161, which may inject latency or delays into simulated operations of simulated volumes. The latency injector 161 may operate based on user-configurable latency characteristics 163 configured by the administrator using the simulated volume configurator 122; and/or based on random or pseudo-random latency generated by the latency injector utilizing a Pseudo-Random Number Generator (PRNG) 162. In some embodiments, the latency injector 161 operates to simulate, for a simulated volume, the latency associated with a real volume. In some embodiments, the latency may be substantially statistically distributed, for example, to simulate an average response time or to simulate an average latency value. In other embodiments, latency may be modeled in accordance with a detailed model or algorithm, for example, taking into account delays that are dependent on particular write locations, seek time, transfer time, modeling the position of the disk head and/or the disk rotation speed, or the like.

Similarly, the simulation module 150 may be associated with an error injector 164, which may inject errors into simulated operations of simulated volumes. Typical errors of real volumes may be injected to the simulated operation of simulated volumes, thereby causing simulated operations of simulated volumes to fail (e.g., in a distribution similar to failures or errors associated with a real volume). The error injector 164 may operate based on user-configurable error characteristics 165 configured by the administrator using the simulated volume configurator 122; and/or based on random or pseudo-random errors generated by the error injector 164 utilizing the PRNG 162, optionally utilizing a list of pre-defined errors or types of errors 156 which may be injected.

Optionally, the simulation module 150 may be associated with a bandwidth limit simulator 167, for example, to limit the number of requests that are to be serviced by the simulated volume during a pre-defined time period, and/or to limit the size (e.g., in bytes) of data provided by the simulated volume (or received by the simulated volume) during a pre-defined time period, thereby simulating a bandwidth limit of a real volume. The bandwidth limit simulator 167 may operate based on user-configurable bandwidth characteristics 168 configured by the administrator using the simulated volume configurator 122.

Optionally, the simulation module 150 may be associated with an operations limit simulator 169, for example, to limit the number of operations that are to be serviced (e.g., concurrently) by the simulated volume during a pre-defined time period, thereby simulating a limit on the number of concurrent operations that a real volume is able to handle. The operations limit simulator 169 may operate based on user-configurable operations limit characteristics 170 configured by the administrator using the simulated volume configurator 122.

In some embodiments, the latency characteristics 163, the error characteristics 165, the bandwidth characteristics 168, and/or the operations limit characteristics 170 may be automatically determined by the storage controller 130 and/or by the simulated volume configurator 122, for example, based on properties of a real volume being simulated by the simulated volume. For example, the administrator may use the simulated volume configurator 122 to create a simulated volume, and to indicate that the simulated volume is to simulate the operation of a real volume having a particular model and manufactured by a particular maker. An internal or external characteristics database 171 may include latency characteristics, error characteristics, bandwidth characteristics, and/or operations limit characteristics for various real volumes; and these characteristics may be automatically obtained from the characteristics database 171 and used by simulation module 150.

In some embodiments, a performance calculator 166 may be included in storage controller 130 and/or in host computer 110. The performance calculator 166 measures and/or tracks one or more performance parameters of system 100, for example, I/O response time, I/O operations rate, I/O throughput, state changes time, or other parameters. Information collected and/or calculated by the performance calculator 166 may be used by the administrator to evaluate the effect of adding or removing one or more simulated volume on the performance of system 100; to evaluate the effect of modifying a property of one or more simulated volumes on the performance of system 100; to evaluate the effects of enhancing or upgrading the storage controller 130 (e.g., by adding volumes); or the like. The performance calculator 166 may generate logs or reports, for example, periodically or on-demand.

In some embodiments, simulation module 150 of storage controller 130 may simulate the existence and operation of simulated volume(s) at a level of a physical hard disk. For example, a physical hard disk may be simulated at the adapter level, at the device driver level, or in the software level that calls the device driver.

In other embodiments, simulation module 150 of storage controller 130 may simulate the existence and operation of simulated volume(s) at a level of a logical hard disk. In some embodiments, simulation of a logical volume may be similar to simulation of a physical volume, but need not necessarily detail or take into account hardware characteristics (e.g., seek time). For example, logical volumes may be simulated at the software level, e.g., substantially below a cache.

In some embodiments, system 100 may not include initially any real volumes, and one or more simulated volumes may be created in order to simulate evaluate the effects of adding real volumes on the performance of system 100. Some embodiments may be used for testing purposes; for example, a customer may define and utilize one or more simulated volumes in order to test one or more scripts (e.g., developed by the customer) that are intended to be deployed in a "production" site, without actually adding real volumes and without affecting the system performance or creating performance risks; once the tested script(s) are successfully executed in conjunction with the simulated volume(s), the scripts may be deployed in conjunction with real volumes (e.g., in the "production" site).

In some embodiments, one or more layers in the software and/or hardware architecture may be adapted to distinguish or differentiate between commands targeted to simulated volumes and commands targeted to real volumes. In some embodiments, for example, the differentiation may be performed, or the simulation of the simulated volumes may be performed, at the level of the storage controller software; at a level that is as close as possible to the real volume(s); or at substantially any other suitable layer of the software.

In some embodiments, one or more components of system 100 (for example, the simulation module 150, or the simulated volume configurator 122) may be aware of the simulated or "fake" property of the simulated volumes 134-135; whereas one or more other components of system 100 (for example, the performance calculator 166, or some of applications 118) may not be aware of the simulated or "fake" property of the simulated volumes 134-135. In some embodiments, the simulated or "fake" property of simulated volumes 134-135 may be fully known to all applications; may be hidden from some applications; may be transparent to some applications; or may be known to some applications and hidden from other applications.

Figure 2:
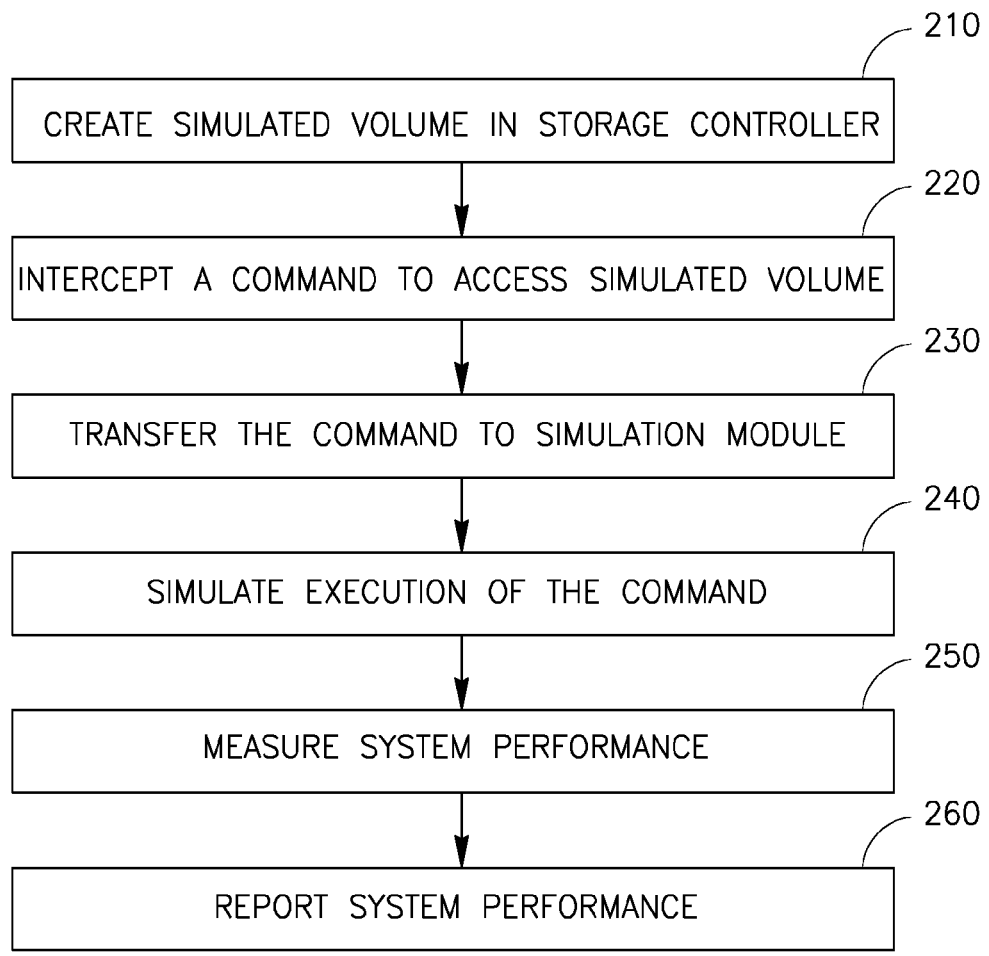
FIG. 2 is a schematic flow-chart of a method of creating and operating storage controller simulated volumes in accordance with some demonstrative embodiments of the invention.

FIG. 2 is schematic flow-chart of a method of creating and operating storage controller simulated volumes in accordance with some demonstrative embodiments of the invention. Operations of the method may be used, for example, by system 100 of FIG. 1, by storage controller 130 of FIG. 1, and/or by other suitable units, devices and/or systems.

In some embodiments, the method may include, for example, creating a simulated volume of or in a storage controller (block 210). This may include, for example, setting one or more properties of the simulated volume (e.g., size, file system, or the like).

In some embodiments, the method may include, for example, intercepting a command to access the simulated volume (block 220).

In some embodiments, the method may include, for example, transferring the command to a simulation module of the storage controller (block 230).

In some embodiments, the method may include, for example, simulating execution of the command (block 240). This may optionally include, for example, injecting latency, injecting errors, taking into account bandwidth limits, taking into account operations limit, or the like.

In some embodiments, the method may include, for example, measuring system performance (block 250) and reporting the system performance (block 260).

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, or semiconductor system (or apparatus or device). Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CDROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A system comprising:
a storage controller for managing access to at least one physical volume and at least one simulated volume, the storage controller comprising:
an interceptor module to intercept a command from a host and determine if the command is to be executed by a physical volume or by a simulated volume; and
a simulation module to simulate access to the at least one simulated volume and to simulate at least one characteristic of a physical volume.

2. The system of claim 1, wherein the interceptor module intercepts at least one of a first command and a second command to access a volume, and if the first command is intercepted, then the command is executed by the at least one physical volume and if the second command is intercepted, then the command is transferred to the simulation module and executed by the at least one simulated volume.

3. The system of claim 1, wherein the simulation module is to simulate latency when simulating access to the at least one simulated volume.

4. The system of claim 1, wherein the simulation module is to simulate an error when simulating access to the at least one simulated volume.

5. The system of claim 1, wherein the simulation module is to simulate a limit to the number of concurrent requests that are serviced during a pre-defined time period when simulating access to the at least one simulated volume.

6. The system of claim 1, wherein the simulation module is to simulate a bandwidth limit when simulating access to the at least one simulated volume.

7. The system of claim 1, wherein the simulation module is to simulate latency based on at least one user-configurable latency characteristics; to simulate an error based on at least one user-configurable error characteristics; to simulate a bandwidth limit based on user-configurable bandwidth limit characteristics; and to simulate a limit to the number of concurrent operations that are handled during a pre-defined time period based on user-configurable operations limit characteristics.

8. The system of claim 7, wherein the simulation module is to automatically retrieve at least one of: the latency characteristics, the error characteristics, the bandwidth limit characteristics, and the operations limit characteristics, from a characteristics database able to store characteristics associated with a physical volume.

9. The system of claim 1, wherein the storage controller comprises a performance calculator to measure an effect of the simulated access to the one or more simulated volumes on one or more system performance parameters.

10. The system of claim 1, wherein the storage controller comprises storage management logic to handle a command received from the host and addressed to the at least one simulated volume.

11. A method comprising:
intercepting a command;
determining if the command is to be executed by at least one physical volume or by at least one simulated volume; and
simulating access to at least one simulated volume if the command is to be executed by a simulated volume and simulating at least one characteristic of a physical volume.

12. The method of claim 11, further comprising:
intercepting at least one of a first command and a second command to access a volume; and
if the first command is intercepted, then the command is executed by the at least one physical volume and if the second command is intercepted, then the command is transferred to a simulation module and executed by the at least one simulated volume.

13. The method of claim 11, wherein simulating at least one characteristic of a physical volume comprises simulating latency when simulating access to the at least one simulated volume.

14. The method of claim 11, wherein simulating at least one characteristic of a physical volume comprises simulating an error when simulating access to the at least one simulated volume.

15. The method of claim 11, wherein simulating at least one characteristic of a physical volume comprises simulating a limit to the number of concurrent requests that are serviced during a predefined time period when simulating access to the at least one simulated volume.

16. The method of claim 11, wherein simulating at least one characteristic of a physical volume comprises simulating a bandwidth limit when simulating access to the at least one simulated volume.

17. The method of claim 11, wherein simulating at least one characteristic of a physical volume further comprises:
simulating latency based on at least one user-configurable latency characteristic;
simulating an error based on at least one user-configurable error characteristic;
simulating a bandwidth limit based on a user-configurable bandwidth limit characteristic; and
simulating a limit to the number of concurrent operations that are handled during a predefined time period based on a user-configurable operations limit characteristic.

18. The method of claim 17, comprising:
retrieving at least one of: the latency characteristic, the error characteristic, the bandwidth limit characteristic, and the operations limit characteristic, from a characteristics database able to store at least one characteristic associated with a physical volume.

19. The method of claim 11, comprising:
measuring an effect of simulating access to the at least one simulated volume on at least one performance parameters.

20. A non-transitory computer program product comprising:
a computer useable medium having computer usable program code embodied therewith, the computer usable program code comprising:
computer usable program code configured to manage data storage, the computer usable program code comprising:
computer usable program code configured to intercept a command from a host and determine if the command is to be executed by at least one physical volume or by at least one simulated volume; and
computer usable program code configured to simulate access to at least one simulated volume if the command is to be executed by a simulated volume and simulate at least one characteristic of a physical volume.

21. The computer program product of claim 20, further comprising:
computer usable program code configured to simulate latency based on at least one user-configurable latency characteristic;
computer usable program code configured to simulate an error based on at least one user-configurable error characteristic;
computer usable program code configured to simulate a bandwidth limit based on a user-configurable bandwidth limit characteristic; and
computer usable program code configured to simulate a limit to the number of concurrent operations that are handled during a predefined time period based on user-configurable operations limit characteristic.

* * * * *